United States Patent [19]
Hasetoh et al.

[11] Patent Number: 5,195,479
[45] Date of Patent: Mar. 23, 1993

[54] DRIVE APPARATUS FOR ONE OR MORE SUPPLEMENTAL APPARATUSES DRIVEN BY AN INTERNAL COMBUSTION ENGINE

[75] Inventors: Sakumi Hasetoh; Osamu Kameda; Hitoshi Akutagawa, all of Hiroshima; Junichi Okita, Iwakuni; Yoshimichi Tanaka, Hiroshima, all of Japan

[73] Assignee: Mazda Motor Corporation, Hiroshima, Japan

[21] Appl. No.: 842,615

[22] Filed: Feb. 27, 1992

[30] Foreign Application Priority Data

Mar. 1, 1991 [JP] Japan .................. 3-036345
Mar. 1, 1991 [JP] Japan .................. 3-36357
Mar. 1, 1991 [JP] Japan .................. 3-036362

[51] Int. Cl.$^5$ ........................... F02B 67/06
[52] U.S. Cl. .................. 123/195 A; 123/41.47; 123/196 R; 123/198 C
[58] Field of Search ............ 123/41.44, 41.47, 195 A, 123/196 R, 198 C

[56] References Cited

U.S. PATENT DOCUMENTS

| | | | |
|---|---|---|---|
| 2,914,137 | 11/1959 | Sykes, Jr. .................. | 123/195 A X |
| 3,384,063 | 5/1968 | Moulton et al. ............ | 123/198 C |
| 3,613,645 | 10/1971 | Froumajou ................. | 123/195 A X |
| 5,063,897 | 11/1991 | Okui et al. ................. | 123/195 A X |
| 5,095,871 | 3/1992 | Mezger ...................... | 123/198 C |

FOREIGN PATENT DOCUMENTS 3838073 5/1990 Fed. Rep. of Germany.

*Primary Examiner*—Tony M. Argenbright
*Attorney, Agent, or Firm*—Keck, Mahin & Cate

[57] ABSTRACT

A drive shaft for driving supplemental apparatuses is disposed in or penetrates an oil pan disposed under an engine in order to provide a compact supplemental apparatus layout or arrangement. In the oil pan, a supplemental apparatus drive unit, including the drive shaft, an idle gear meshing with an output gear fixed on an engine crankshaft, and a chain for transmitting drive power from the idle gear to the drive shaft, is supported, and is simultaneously assembled so as to be linked with the idle gear and the output gear when the oil pan is assembled to the engine. The output gear is preferably fixed on the inner side of an endmost journal of the crankshaft to reduce vibrations from the crankshaft. Moreover, providing a damper associated with the output gear fixed to the crankshaft reduces the vibrations from the crankshaft. By providing supplemental appartuses on both ends of the drive shaft, by placing an oil pump near an oil filter, and by placing the oil pump in the oil pan and a water pump out of the oil pan, a compact engine and supplemental apparatus structure, a low oil flow resistance, a reduction in the number of required parts, and so on, are produced.

15 Claims, 6 Drawing Sheets

DRIVE APPARATUS FOR ONE OR MORE SUPPLEMENTAL APPARATUSES DRIVEN BY AN INTERNAL COMBUSTION ENGINE

BACKGROUND OF THE INVENTION

1. Field of the Invention

This invention relates to a drive apparatus for one or more supplemental apparatuses driven by an internal combustion engine.

Supplemental apparatuses used in conjunction with an automotive vehicle engine are generally driven by power produced by the engine. Consequently, in order to realize maximum performance and use available space efficiently, both the structure linking the engine and the supplemental apparatuses and the layout of the engine and the supplemental apparatuses are very important.

Typically, in an engine and supplemental apparatus combination, a compact supplemental apparatus having a low drive load requirement, such as an oil pump for a lubrication and/or a water pump, is disposed near a front end of the engine and is directly linked to, or otherwise engaged via gearing with, a crankshaft of the engine. By contrast, a supplemental apparatus having a high drive load requirement, such as a power steering pump, a compressor for an air conditioner, and/or an alternator, is typically disposed on a side of the engine and near either a front end or a rear end of the engine. This type of supplemental apparatus is also typically driven by a belt or a chain connected with an end of the engine crankshaft.

2. Description of Related Art

As described in, for instance, the specification of West German Patent Publication No. 3,838,073, an engine may be mounted at a backward slant or a tilt so that it leans toward a rear end of a vehicle. The engine of the disclosure of this publication is mounted parallel to a transmission so as to extend transversely of the body of the vehicle, and has a supplemental apparatus disposed in a space located in front of the engine. This space is formed by the backward slant or tilt of the engine. A belt, linked to the engine crankshaft, drives the supplemental apparatus disposed in the space located in front of the engine.

There is a demand to compactly mount the supplemental apparatus in the volume available for the engine. Such a demand is met by using an unused space, which is located at a front or rear side of an oil pan of the engine. In order to locate the supplemental apparatus in the dead or unused space around the oil pan, however, it is necessary to reinforce a supporting portion or bearing of the supplemental apparatus in order to provide it with a sufficient rigidity to resist tension applied by the belt. It is also necessary to provide a space in which to locate a drive shaft, which links the supplemental apparatus with the engine crankshaft. These requirements undesirably force the volume of the oil pan to be reduced; therefore, the volume of oil available to the engine may be insufficient in some cases. Consequently, as is clear from the specification of the West German publication mentioned above, it is difficult to receive the supplemental apparatus in the dead or unused space around the oil pan in the desired manner. Another requirement is that it must be possible to assemble the supplemental apparatus to the engine readily. More particularly, in order to assemble a plurality of supplemental apparatuses and their drive mechanism to the engine in a fully automated assembling line, it is essential to provide the supplemental apparatuses and their drive mechanism as a single unit. However, it is difficult to unite conventional belt-driven supplemental apparatuses and their drive mechanism as a single unit. In addition, for such belt-driven supplemental apparatuses, it is also essential to improve the structural rigidity of a supporting element or supporting elements for the drive shaft, due to the presence of a considerably increased belt tension. Providing such a supporting element or supporting elements, however, results in both an increased engine weight and the occurrence of some vibrations.

Particular problems associated with an oil pump of an engine of the prior art also exist. In a layout of a supplemental apparatus and its drive mechanism according to the prior art, an oil passage or "sub-gallery" between the oil pump and its associated oil filter is required to be relatively long. As a result, a loss of pressure is present in the sub-gallery. This is because the oil pump is generally disposed near a crankshaft and is driven by the crankshaft through gearing. Further, because a limited space is present, it is difficult for an oil filter to be located near both the oil pump and the crankshaft. Disposing the oil pump and its associated oil filter separately from each other results in a long distance between the oil pump and the oil filter and in an increased oil flow resistance, or pressure loss.

The layout of the oil pump cannot be considered alone without also considering the layout of a water pump, which also serves as a supplemental apparatus. Both the oil pump and the water pump provide a low load to drive, as mentioned above, and the oil pump and the water pump can be provided close to each other in a layout. In order to provide a compact supplemental apparatus layout and drive as many of the supplemental apparatuses as possible by a single drive shaft, at least the oil pump and the water pump must be driven by the same drive shaft and disposed inside the oil pan. The number of bearings for these pumps should also be reduced so that no more of these bearings than are necessary are provided. Additionally, the oil pump should be disposed in a location in which an oil leak will never happen. It is important for a compact and satisfactory layout of the supplemental apparatuses to satisfy all these conditions or considerations.

In an arrangement such as that described above, a flywheel of the engine is generally connected to rear end of the crankshaft at which a clutch is coupled. A pulley for driving a supplemental apparatus, through a belt, is generally fixed at a front end of the crankshaft, opposite to the end of the crankshaft which is connected with the clutch. Furthermore, the pulley on the front side of the crankshaft may have a built-in damper mechanism which dissipates twisting vibrations of the crankshaft. Since the pulley on the front end of the crankshaft itself typically has considerable weight, putting the damper in the pulley so as to surround an axis portion, or a portion around the center axis of the pulley, and an outer mass portion, or an outside ring portion, helps damp the crankshaft against twisting vibrations. The damper may, for example, be formed of an elastic member made of rubber. The amplitude of the twisting vibrations is at a maximum on the front end of the crankshaft, while a vibration node is located at the rear end of the crankshaft on which the flywheel is mounted and connected to the transmission via the clutch. Consequently, the twisting vibration of the crankshaft is effectively dissipated by the aid of the pulley on the front end of the crankshaft, which drives the supplemental apparatus.

The provision of such a damper in a pulley mounted on the front end of the crankshaft is effective in dissipating twisting vibrations, but is ineffective for dissipating bending vibrations of the crankshaft. Because the crankshaft bends between the journals, especially at its rear end portion where the flywheel is attached, due to vibrations of the rearmost end cylinder, it causes the flywheel t.o vibrate, so that bending of the crankshaft increases noise and is produced. Accordingly, providing the damper on the front end of the crankshaft, located far from the rear end thereof, where bending is the most serious, cannot effectively reduce the bending vibration. In addition, although the damper on the front end of the crankshaft lessens the vibrations of the crankshaft more effectively as it is made heavier, since a natural frequency of the damper is lowered with an increase in weight of the flywheel, the range of vibrations of the crankshaft which can be damped, by an inverted phase, is narrowed. Consequently, the rigidity of the crankshaft against twisting is decreased in the range of the same phases of vibration of the crankshaft as of the flywheel.

Twisting vibration problems typically arise in engines having supplemental apparatuses. If a supplemental apparatus is driven by a chain or a belt linked with a crankshaft, a shift in angular velocity of the crankshaft is transmitted to the supplemental apparatuses through the chain or the belt. Twisting vibration will be transmitted to the supplemental apparatuses, even if a structure is used which provides drive power for the supplemental apparatuses which is supplied from the rear end or minimum point of the twisting vibration so as to eliminate twist vibration influences. As a result, extraordinary gear engagement noise may occur at the connection between the gears.

SUMMARY OF THE INVENTION

It is one object of this invention to provide a drive apparatus for a supplemental apparatus or supplemental apparatuses which is compact and arranged around an oil pan.

It is another object of this invention to provide a drive apparatus for a supplemental apparatus or supplemental apparatuses driven by an internal combustion engine which is constructed so that the supplemental apparatus or apparatuses and the drive mechanism can be assembled as a single unit to the engine.

It is a further object of this invention to provide a drive apparatus for a supplemental apparatus or supplemental apparatuses of an internal combustion engine in which bending vibrations of a crankshaft of the engine are reduced effectively.

The forgoing objects are accomplished, according to present invention, by providing a particular drive apparatus for at least one supplemental apparatus driven by an internal combustion engine. The drive apparatus includes a drive shaft for driving the supplemental apparatus, and power transmission means for transmitting drive power from an output shaft of the engine to the drive shaft. The drive shaft and power transmission means are disposed in an oil pan located under the engine.

According to a preferred embodiment of the invention, the power transmission means comprises an output gear fixed to the output shaft, an idle gear in mesh with the output gear, and a chain for coupling the idle gear and the drive shaft. Preferably, the idle gear is located at a position at which no force couple is produced by forces from the chain and the output gear. A supporting portion for the idle gear extends in a direction of these forces.

In accordance with another aspect of the invention, a drive apparatus for at least one supplemental apparatus driven by an internal combustion engine includes drive power deriving means for deriving drive power from an output shaft of the engine, and a supplemental apparatus drive unit supported in an oil pan disposed under the engine and simultaneously assembled so as to be linked with the drive power deriving means when the oil pan is assembled. The supplemental apparatus drive unit includes a drive shaft for driving at least one supplemental apparatus and power transmission means for linking the drive power deriving means with the drive shaft.

In accordance with yet another aspect of the invention, a drive shaft for driving supplemental apparatuses driven by an internal combustion engine penetrates an oil pan disposed under the engine.

According to another preferred embodiment of the invention, the supplemental apparatuses are disposed on both ends of the drive shaft. The oil pan is preferably disposed not only under the engine but also under a transmission placed beside the engine.

In accordance with yet another aspect of the invention, a supplemental apparatus system includes an oil pump mounted on an inner side wall of an oil pan and driven by a drive shaft disposed in the oil pan, and filtering means for filtering oil mounted on an outer side of the oil pan and placed so that an inlet of the filtering means is located in the vicinity of an outlet of the oil pump.

In accordance with yet another aspect of the invention, a drive apparatus is structured with a crankshaft having a flywheel fixed on one end thereof and an output gear for deriving drive power fixed on the inner side of an endmost journal of the crankshaft.

According to another preferred embodiment of the invention, either or both of the output gear and a gear in mesh with the output gear have a damper filled between gear ring and a mounting ring.

According to yet another preferred embodiment of the invention, a phase and order of pulsation of a supplemental apparatus such as an oil pump is adjusted to an inverted phase and order of change in angular velocity of the crankshaft to cancel the pulsation.

In accordance with another aspect of the invention, a supplemental apparatus structure includes a water pump disposed outside of an oil pan, a oil pump disposed inside of the oil pan, and a drive shaft connecting both of the oil and water pumps to drive both of the pumps.

BRIEF DESCRIPTION OF THE DRAWINGS

The above and other objects and features of the present invention will be apparent to those skilled in the art from the following description of preferred embodiments thereof when considered in conjunction with the drawings, in which.

DETAILED DESCRIPTION OF THE PREFERRED EMBODIMENTS

Figure 1:
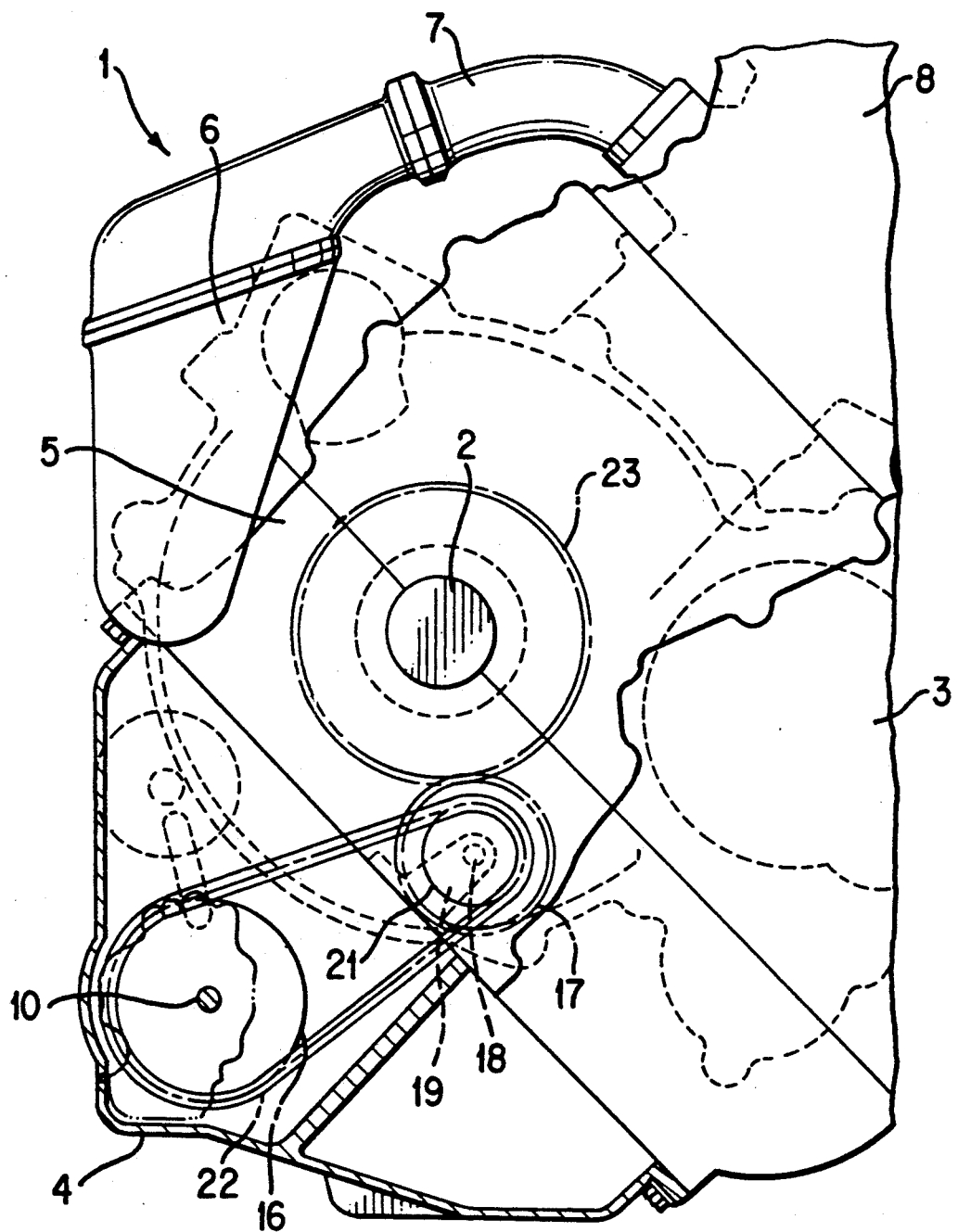
FIG. 1 is a schematic front view, partially in section, of a drive apparatus for supplemental apparatuses driven by an internal combustion engine according to a preferred embodiment of the present invention.

Referring to FIG. 1, an engine, generally indicated by reference number 1 and shown as an in-line four cylinder engine, is mounted in an appropriate location at the front of a vehicle body (not shown). A crankshaft 2 of the engine 1 is disposed so that it extends in the direction of the width of the vehicle body. The engine 1 is mounted so that it slants backward or tilts toward the rear end of the vehicle. A transmission 3 is disposed behind and close to the engine. The transmission 3 is placed with its lengthwise axis parallel to the engine crankshaft 2. A single oil pan unit 4 is disposed under and secured to the engine 1 and the transmission 3. A surge tank 6 is disposed in front of the engine 1 near a lower block 5 forming a skirt portion of an engine block. An intake pipe 7, connecting the surge tank 6 with a combustion chamber formed by the respective cylinder, extends and curves upward, and is connected to a cylinder head 8.

Figure 3:
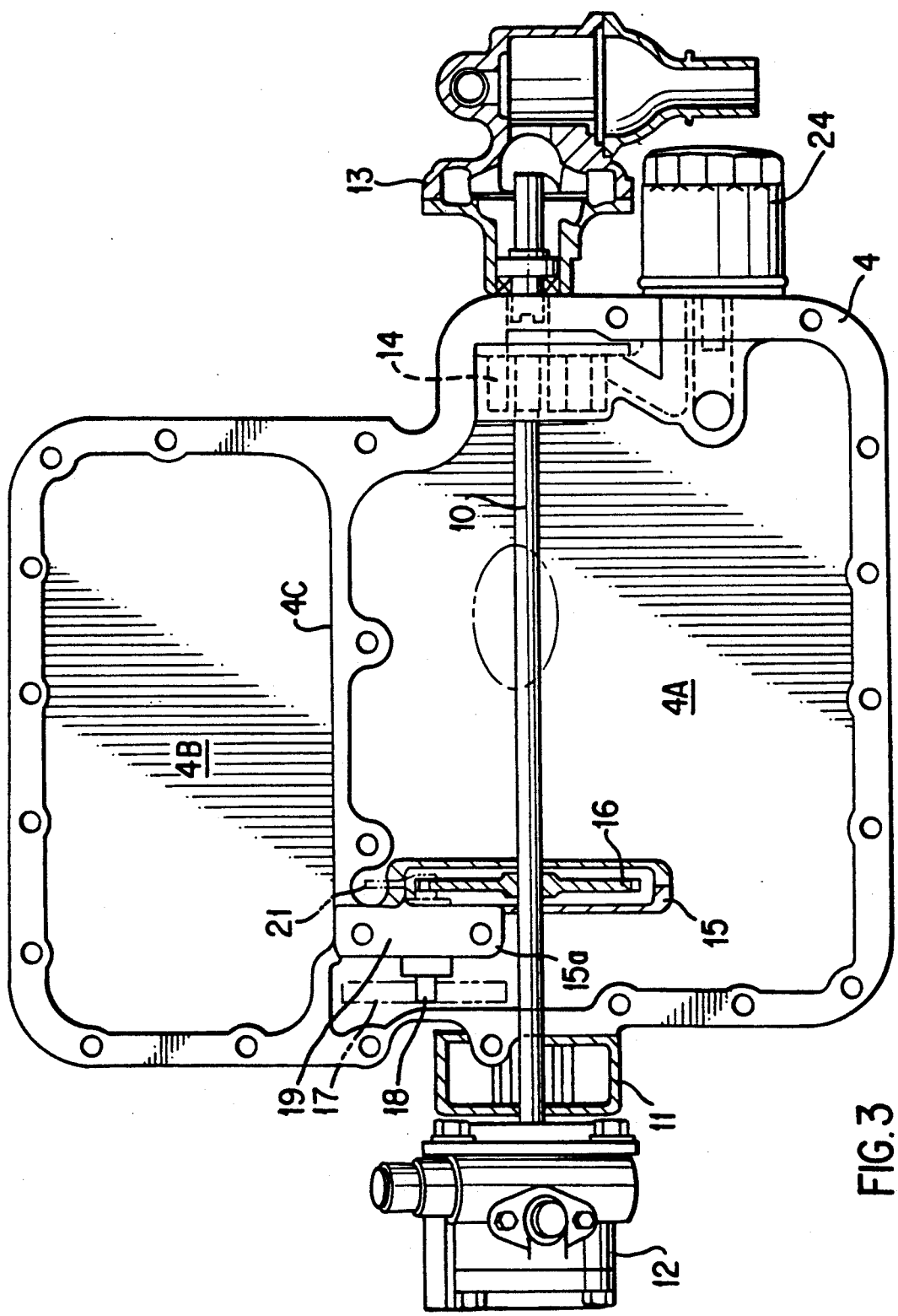
FIG. 3 is a plan view illustrating a layout of engine and the supplemental apparatuses of the arrangement shown in FIG. 1.
Figure 4:
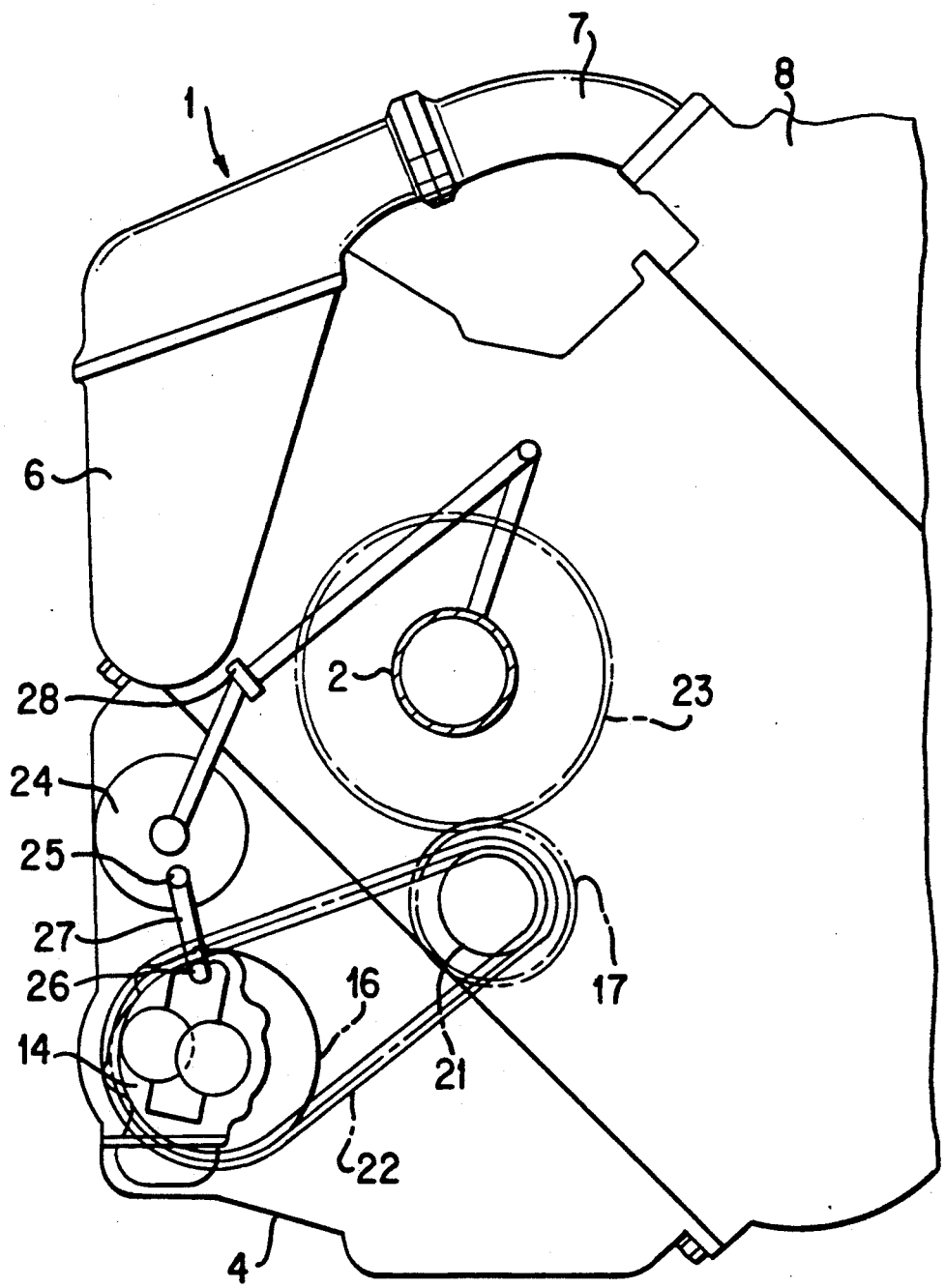
FIG. 4 is a schematic illustration, from a front side of the engine, showing an oil passage structure of the engine according to the embodiment of the present invention shown in FIG. 1.

Since the engine slants backward or tilts toward the rear end of the vehicle, a space, having an approximately triangular sectional shape, as viewed from the front end of the engine 1, is formed under the engine 1. The oil pan 4 is configured so that it substantially fills the rectangularly shaped space formed under the engine 1. In order to provide the oil pan 4 with a sufficient volume, the oil pan 4 is extended. More particularly, the oil pan 4 is formed so that it extends, in the same direction as the engine 1, from the vicinity of an engine clutch housing 9 to an inner position, located before a front end position of the engine 1. The oil pan is also formed so that it extends under the transmission 3 and covers substantially the entire underside of the transmission 3, as is clear from FIG. 3.

Figure 2:
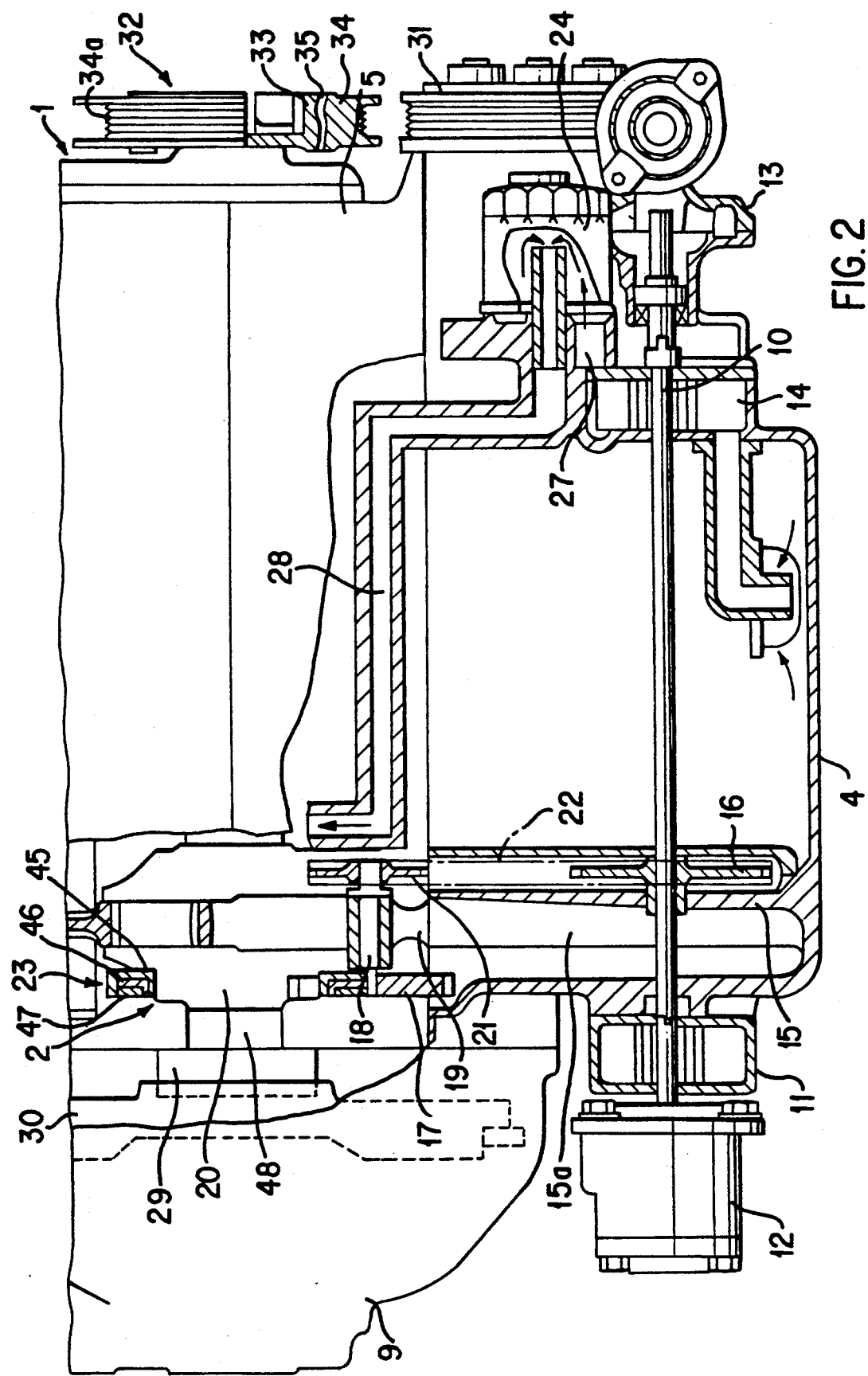
FIG. 2 is a side view, partially in section, of the drive apparatus of FIG. 1, as seen from a side of the engine.

Referring to FIG. 2, a drive shaft 10 for at least one supplemental apparatus is disposed under the engine 1 and extends parallel to the crankshaft 2 so as to penetrate the oil pan 4. An oil pump 11 for an automatic transmission is disposed at the rear side of the engine 1, near the oil 4, under the engine clutch housing 9. A pump 12 for power steering is disposed after and coaxially with the oil pump 11 for the automatic transmission 11. The oil pump 11 for the automatic transmission and the pump 12 for power steering are connected, in series, with one end of the drive shaft 10 so that they receive drive power from the drive shaft 10. On the front end side of the engine 1, a water pump 13 is disposed in a casing placed, on the front side of the oil pan 4, under the engine 1. The water pump 13 is connected with the other end of the drive shaft 10. An oil pump 14 for lubricant is disposed inside the oil pan 4 under the engine 1 adjacent the water pump 13. The oil pump 14 for lubricant is free from oil leakage, because the oil pump 14 is itself located in the oil pan 4. The oil pump 14 for lubricant is connected with the drive shaft 10. All these pumps 11, 12, 13 and 14, which are supplemental apparatuses, are mounted on, or "shared by," the drive shaft 10 penetrating the oil pan 4. As a result, a compact layout or arrangement of the engine 1, utilizing the dead or unused space provided by the backward slant of the engine, is realized.

The oil pan 4 is provided with an open-ended, generally thin box-shaped buffer wall 15, formed in the oil pan 4 closer to the rear wall of the oil pan 4 than the front wall of the oil pan 4 and adjacent to a partition wall 4C of the oil pan 4 dividing the oil pan into two o chambers, namely an engine oil chamber 4A and a transmission oil chamber 4B, penetrated by the drive shaft 10. A sprocket 16, mounted on the drive shaft 10, is located within the box-shaped buffer wall 15. The oil pan 4 is further provided with a buffer extension 15a located laterally adjacent the oil chamber 4B and extending toward the rear end of the engine 1. In an upper portion of the buffer extension 15a, a supporting member 19 is formed so as to support rotatively a shaft 18 of an idle gear 17 disposed so as to face an endmost web, for instance, the eighth web, in the case of an in-line, four-cylinder engine. Such an endmost web or connecting rod throw 20 is located at the rear end of the crankshaft 2. The idle gear shaft 18 is fixed, at its one end, with a drive sprocket 21 positionally corresponding to the driven sprocket 16. The drive sprocket 21 and the driven sprocket 16 are operationally connected by a drive chain 22. The crankshaft 2 is provided with an output gear 23 integrally formed on the outer periphery of the endmost web 20 and in mesh with the idle gear 17 so as to transmit rotation to the drive shaft 10 through the idle gear 17, the drive sprocket 21, and the driven sprocket 16.

Figure 5:
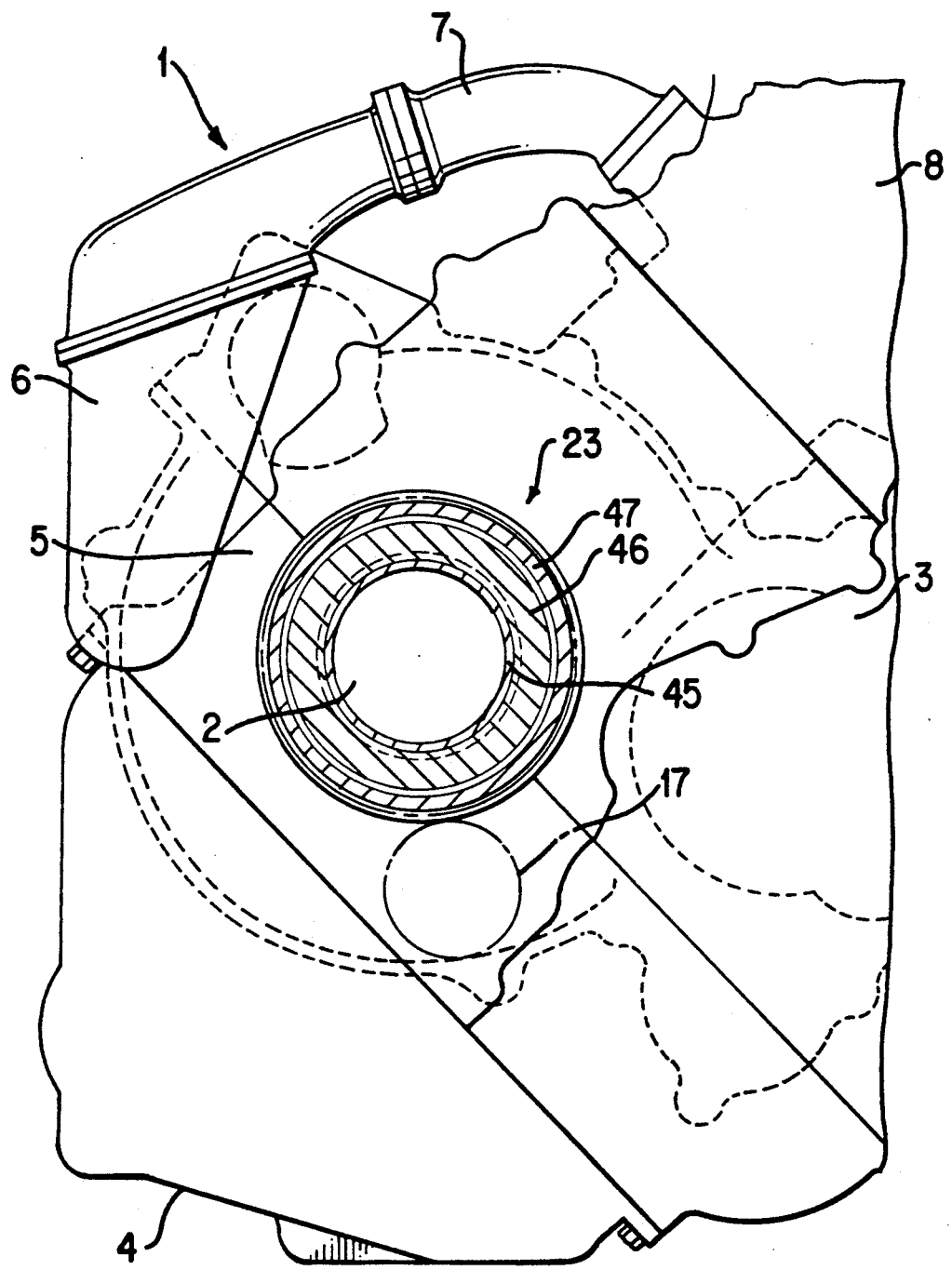
FIG. 5 is a schematic illustration, partially in section, of the drive apparatus of FIG. 1, showing a structure of an output gear, as seen from a front side of the engine.

Referring to FIGS. 2 and 5, the output gear 23, formed as a gear ring 47 with external gear teeth, is fixedly mounted on a mounting ring 45, having a generally L-shaped cross section and press fitted onto the endmost web 20 of the crankshaft 2, through a rubber ring 46 provided between rings 45 and 47. The rubber ring 46 serves as a damping means for absorbing bending and twisting of the crankshaft 2. In addition to the output gear 23, fitted onto the endmost web 20 of the crankshaft 2 and located on the inner side of an endmost journal 48 of the crankshaft 2, the crankshaft 2 is provided with a flywheel 30 secured to a rear end mount 29 thereof adjacent the endmost journal 48. Because the output gear 23, acting as a damping means, is provided on the crankshaft 2 in a position at which the crankshaft 2 is subjected to the most serious bending, bending vibrations of the crankshaft 2 are effectively dissipated.

The output gear 23, fixed to the crankshaft 2, transmits rotation of the crankshaft 2 to the supplemental apparatus drive shaft 10 through the idle gear 17, integral with the drive sprocket 21, and the driven sprocket 16, fixed to the drive shaft 10, which is operationally connected to the drive sprocket 21 by the chain 22. As a result, the drive shaft 10 drives the automatic transmission oil pump 11, the power steering pump 12, the water pump 13, and the lubricant oil pump 14 all together. In transmitting drive power, the idle gear shaft 18 is subjected, on its one end, to a force applied to the idle gear 17 from the output gear 23, in mesh with the idle gear 17, and on the other end to a force equal to a tension of the chain 22. However, because the supporting member 19 is located at a position at which the forces act on the opposite ends of the shaft 18 in the same direction, namely, vertically downward as viewed in FIG. 2, no force couple, which applies pressure locally to a bearing surface of the supporting member 19, arises on the shaft 18.

Oil pan 4 is provided with an oil filter 24 attached to the outer surface of the front wall of the oil pan 4 so that an inlet 25 of the oil filter 24 is in communication with an outlet 26 of the lubrication oil pump 14. Due to the arrangement of the oil filter 24 and the lubrication oil pump 14, a "sub-gallery" 27, between the outlet 26 of the lubrication oil pump 14 and the inlet 25 of the oil filter 24, is short in length, so as to decrease pressure loss. Lubricant oil, introduced into the oil filter 24 via the sub-gallery 27, is supplied, via a main gallery 28, to various portions of the engine 1, for example, journals of the crankshaft 2, etc.

Figure 6:
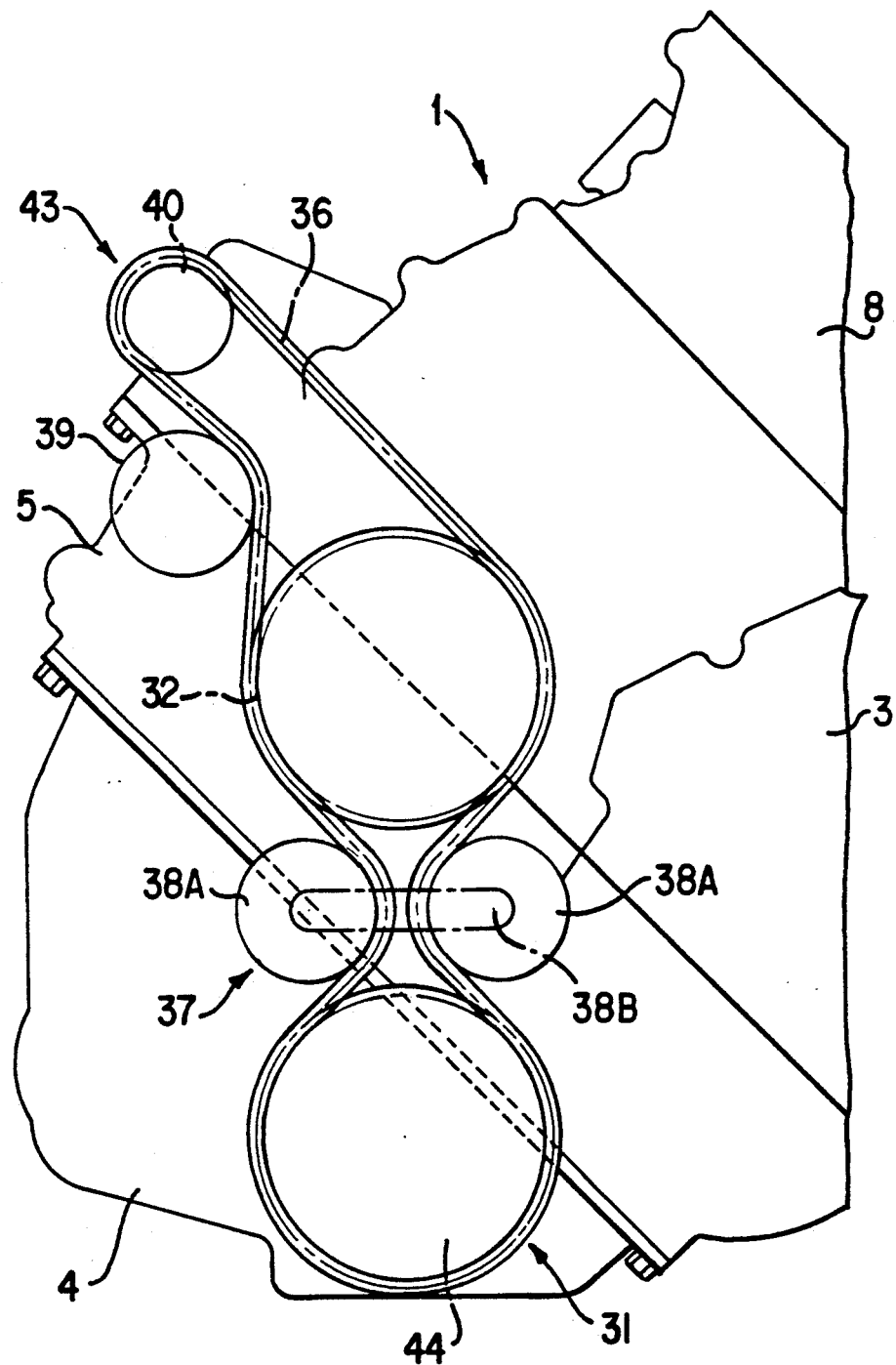
FIG. 6 is a schematic illustration, as seen from a front side of the engine, showing a layout of supplemental apparatuses driven by crank pulleys according to the present invention.

Referring to FIGS. 2 and 6, the crankshaft 2 is provided at its front end with a crankshaft pulley 32, which is coupled to an air conditioner compressor 31 by a belt (not shown). The crankshaft pulley 32 is formed as a pulley ring 34, with a belt groove 34a formed on its outer periphery, fitted onto a pulley mount 33 integrally formed with the crankshaft 2 through a rubber ring 35 filled therebetween. The rubber ring 35 functions as a damper for twisting vibrations of the crankshaft 2. Consequently, twisting vibrations of the crankshaft 2 are effectively absorbed by both of the crankshaft pulley 32 and the output gear 23 fixed at the opposite ends of the crankshaft 2. Since the pulley gear 49 serves as a vibration damper, a change in angular velocity and twisting vibrations, transmitted to the supplemental apparatuses via the idle gear 17, are reduced, so as to prevent the output gear 23 and the idle gear 17 from producing noises.

Connecting the oil pump 14 directly to the drive shaft 10 enables more effective reduction of changes in angular velocity and associated twisting vibrations of the crankshaft 2, transmitted to the supplemental apparatuses via the idle gear 17, with the use of pulsations of oil discharged by the oil pump 14. That is, the ratio of rotation speed of the supplemental apparatus drive shaft 10 relative to rotation speed of the crankshaft 2 is properly determined so as to properly adjust the phase and order of discharge pulsations of the oil pump 14. More specifically, the oil pump 14 inherently produces variations in the quantity of oil discharged therefrom. Variations in the quantity of oil discharged by the oil pump 14 produce periodic changes in a torsional force applied to the drive shaft 10. On the other hand, the angular velocity and twisting vibrations of the crankshaft 2 also periodically change. To cancel the effects of the periodic changes in angular velocity and twisting vibrations on the crankshaft 2, the ratio of rotation speeds referred to above is determined so that these effects are cancelled by a reaction force produced by the torsional force applied to the drive shaft.

An alternator 43 is disposed on the front side of the engine 1. The alternator 43 is attached to an upper portion of the engine 1. The alternator pulley 40 is almost symmetrically disposed with respect to the crankshaft pulley 32 relative to the compressor pulley 44. However, the alternator pulley 40 is offset forward with respect to a vertical diametric line passing through a center of the crankshaft pulley 32 relative tot eh compressor 31. All of the pulleys 32, 40 and 44 are operationally connected or coupled by a drive belt 36. There are provided a tensioning means 37, disposed between the crankshaft pulley 32 and the compressor pulley 44, and an idler roller 39, disposed between the crankshaft pulley 32 and the alternator pulley 40. The tensioning means 37 comprises a pair of tension rollers 38A connected by a connection arm 38B so as to apply a proper tension to the belt 36 between the crankshaft pulley 32 and the compressor pulley 44. The tensioning roller 38A and the idler roller 39, thus arranged, allow angles, through which the drive belt 36 contacts outer peripheries of the crankshaft pulley 32, the compressor pulley 44 and the alternator pulley 40, to large, as shown in FIG. 6.

Various kinds of belt driven supplemental apparatus drive mechanisms or apparatuses, in which more than two supplemental apparatuses disposed on either the front or the rear side of an engine are driven by a single drive belt, have been realized. In such a belt driven supplemental apparatus drive mechanism, it is typical to operationally couple a crankshaft pulley and supplemental apparatus pulleys, disposed in a generally triangular formation, by a drive belt. In this case, the supplemental apparatuses have a large drive load requirement, and the drive belt is subjected to an imbalance in tension between a tightened side and a loosened side. Consequently, when the engine increases its speed rapidly, slippage between the drive belt and the pulleys may occur on the tightened side of the drive belt, due to a rapid increase in tension.

In order to eliminate such slippage effectively, it was thought that a tensioning device should be located so as to provide a large angle through which the belt surrounds the pulley of the supplemental apparatus or apparatuses having a large drive load requirement and to have the belt be in contact with the crankshaft pulley at two circumferential sections. However, because there may be a relatively large number of supplemental apparatuses driven by a single drive belt and laying of the drive belt is complex, it is difficult to arrange the necessary number tensioning means, since only a limited space is available.

In contrast with conventional belt driven supplemental apparatus drive mechanisms or apparatuses, the belt driven supplemental apparatus drive apparatus according to the preferred embodiment of the present invention described above drives supplemental apparatuses having a relatively small drive load requirement and a relatively large drive load requirement differently. Supplemental apparatuses having a small drive load requirement include the water pump 13 and the oil pump 14, disposed around the oil pan 4. The water pump 13 and the oil pump 14 are driven by the drive shaft 10 supported by the oil pan 4. Specific supplemental apparatuses having relatively large drive load requirements, such as the air conditioner compressor 31 and the alternator 43 disposed on the front side of the engine, are driven by the drive belt 36, which is moved by crankshaft 2. This divided arrangement of the plurality of supplemental apparatuses enables a plurality of tensioning means and idler rollers to be arranged so as to apply a proper tension to the drive belt.

Although the idle shaft supporting member is disclosed as being provided as a part to be fixed to the oil pan, it may be formed integrally with the oil pan. Also, various combinations of supplemental apparatuses, which are mounted on opposite end portions of the supplemental apparatus drive shaft, are possible. The supplemental apparatus drive mechanism according to the preferred embodiment of the present invention is installed in an engine with a transmission coupled to the engine in series.

The damper means installed in the front end of the crankshaft 2 can be omitted. Also, the damper means incorporated in the output gear 23 of the rear end of the crankshaft 2 may function to dissipate either bending vibrations or twisting vibrations. In addition, although the output gear 23 is designed to perform a damping function, the idle gear 17 may alternatively perform the damping function if reduction of the sound or noise of grinding gears only is desired.

It is finally to be understood that although preferred embodiments of the present invention have been described, various other embodiments and variations may occur to those skilled in the art which fall within the scope and spirit of the invention, and such other embodiments and variations are intended to be covered by the following claims.

What is claimed is:

1. A drive apparatus for at least one supplemental apparatus which is driven by an internal combustion engine having an output shaft and connected with an oil pan disposed under the engine, said drive apparatus comprising:
    a drive shaft, disposed in said oil pan, for driving said at least one supplemental apparatus; and
    power transmission means, disposed in said oil pan, for linking said output shaft with said drive shaft so as to transmit drive power between said output shaft and said drive shaft.

2. A drive apparatus according to claim 1, wherein said power transmission means comprises an output gear fixed to said output shaft for deriving said drive power, an idle gear in mesh with said output gear, and a chain for operationally coupling said idle gear and said drive shaft so as to drive said at least one supplemental apparatus.

3. A drive apparatus according to claim 2, wherein said idle gear is located in a position at which tension applied by said chain and an engagement force between said idle gear and said output gear do not produce a force couple, and further comprising a supporting portion having a bearing for said idle gear and extending in a direction of said tension and said engagement force.

4. A drive apparatus according to claim 3, wherein said power transmission means further includes a sprocket fixed on said drive shaft for being driven by said chain, and a buffer wall surrounding said sprocket in said oil pan and extended so as to support said supporting portion.

5. A drive apparatus for at least one supplemental apparatus which is driven by an internal combustion engine having an output shaft and connected with an oil pan assembled so as to be disposed under the engine, said drive apparatus comprising:
    drive power deriving means, fixed on said output shaft, for deriving drive power from said output shaft;
    a supplemental apparatus drive unit, supported in said oil pan and simultaneously assembled so as to be linked with said drive power deriving means when said oil pan is assembled, including:
    a drive shaft for driving said at least one supplemental apparatus; and
    power transmission means for linking said drive power deriving means with said drive shaft so as to transmit drive power between said output shaft and said drive shaft.

6. A drive apparatus according to claim 5, wherein said drive power deriving means comprises an output gear, and said power transmission means comprises an idle gear in mesh with said output gear and a chain for transmitting rotation to said drive shaft for driving said at least one supplemental apparatus.

7. A drive apparatus for at least one supplemental apparatus which is driven by an internal combustion engine having an output shaft and connected with an oil pan disposed under the engine, said drive apparatus comprising:
    a drive shaft, disposed so that it penetrates said oil pan, for driving said at least one supplemental apparatus; and
    power transmission means for linking said output shaft with said drive shaft so as to transmit drive power between said output shaft and said drive shaft.

8. A drive apparatus according to claim 7, wherein a plurality of said supplemental apparatuses are disposed on opposite ends of said drive shaft.

9. A drive apparatus for a plurality of supplemental apparatuses connected with an oil pan under an internal combustion engine having an output shaft and a transmission, which are disposed in parallel, said drive apparatus comprising:
    a drive shaft, disposed so that it penetrates said oil pan, said supplemental apparatuses being fixed on opposite ends of said drive shaft; and
    power transmission means, disposed in said oil pan, for linking said output shaft with said drive shaft so as to transmit drive power between said output shaft and said drive shaft.

10. A supplemental apparatus system for an combustion engine having an output shaft and an oil pan disposed under the engine, said supplemental apparatus system comprising:
    a drive shaft, disposed in said oil pan;
    power transmission means, disposed in said oil pan, for linking said output shaft with said drive shaft so as to transmit drive power between said output shaft and said drive shaft;
    an oil pump mounted on an inner side wall of said oil pan, said oil pump being connected to an end of said drive shaft so as to be driven by said drive shaft and having an outlet at said inner side wall; and
    oil filtering means for filtering oil placed, in the vicinity of said outlet of said oil pump, on an outer side wall of said oil pan so as to connect an inlet of said oil filtering means with said outlet.

11. A supplemental apparatus system according to claim 10, wherein said power transmission means adjoins a side wall opposite to the side wall on which said oil pump is placed.

12. A drive apparatus for at least one supplemental apparatus for an internal combustion engine, driven by a crankshaft having a flywheel fixed to an end thereof, said drive apparatus comprising:
    a plurality of journals formed on said crankshaft, an endmost journal of said plurality of journals having one end adjoining said flywheel; and drive power deriving means for deriving drive power from said crankshaft adjoining the other end of said endmost journal.

13. A drive apparatus according to claim 12, wherein said drive power deriving means comprises an output gear fixed adjoining to the other end of said endmost journal, and an idle gear meshing with said output gear to transmit said drive power, at least one of said output gear and said idle gear having a damper provided between a gear ring and a mounting ring thereof.

14. A drive apparatus according to claim 12, wherein said at least one supplemental apparatus is adjusted in accordance with changes in angular velocity of said crankshaft so as to cancel pulsations of the supplemental apparatus.

15. A supplemental apparatus system structure for an internal combustion engine having an output shaft and an oil pan disposed under the engine, said supplemental apparatus system structure comprising:
- a water pump disposed outside of said oil pan;
- an oil pump disposed inside of said oil pan; and
- a drive shaft connected with both said water pump and said oil pump so as to drive both said water pump and said oil pump by drive power from said output shaft.

* * * * *